No. 611,948. Patented Oct. 4, 1898.
G. SMETHURST.
SPEED VARYING MECHANISM FOR PULLEYS.
(Application filed May 12, 1898.)

(No Model.) 2 Sheets—Sheet I.

Witnesses:
Inventor:
George Smethurst
By
Attorney.

No. 611,948. Patented Oct. 4, 1898.
G. SMETHURST.
SPEED VARYING MECHANISM FOR PULLEYS.
(Application filed May 12, 1898.)
(No Model.) 2 Sheets—Sheet 2.

Witnesses:
H. P. Guillo.
Wm Maynadier

Inventor:
George Smethurst
By J. E. Maynadier
Attorney.

UNITED STATES PATENT OFFICE.

GEORGE SMETHURST, OF MAYNARD, MASSACHUSETTS.

SPEED-VARYING MECHANISM FOR PULLEYS.

SPECIFICATION forming part of Letters Patent No. 611,948, dated October 4, 1898.

Application filed May 12, 1898. Serial No. 680,443. (No model.)

*To all whom it may concern:*

Be it known that I, GEORGE SMETHURST, of Maynard, in the county of Middlesex and State of Massachusetts, have invented a new and useful Speed-Varying Mechanism for Pulleys, of which the following is a specification, reference being had to the accompanying drawings, in which—

Figure 1:
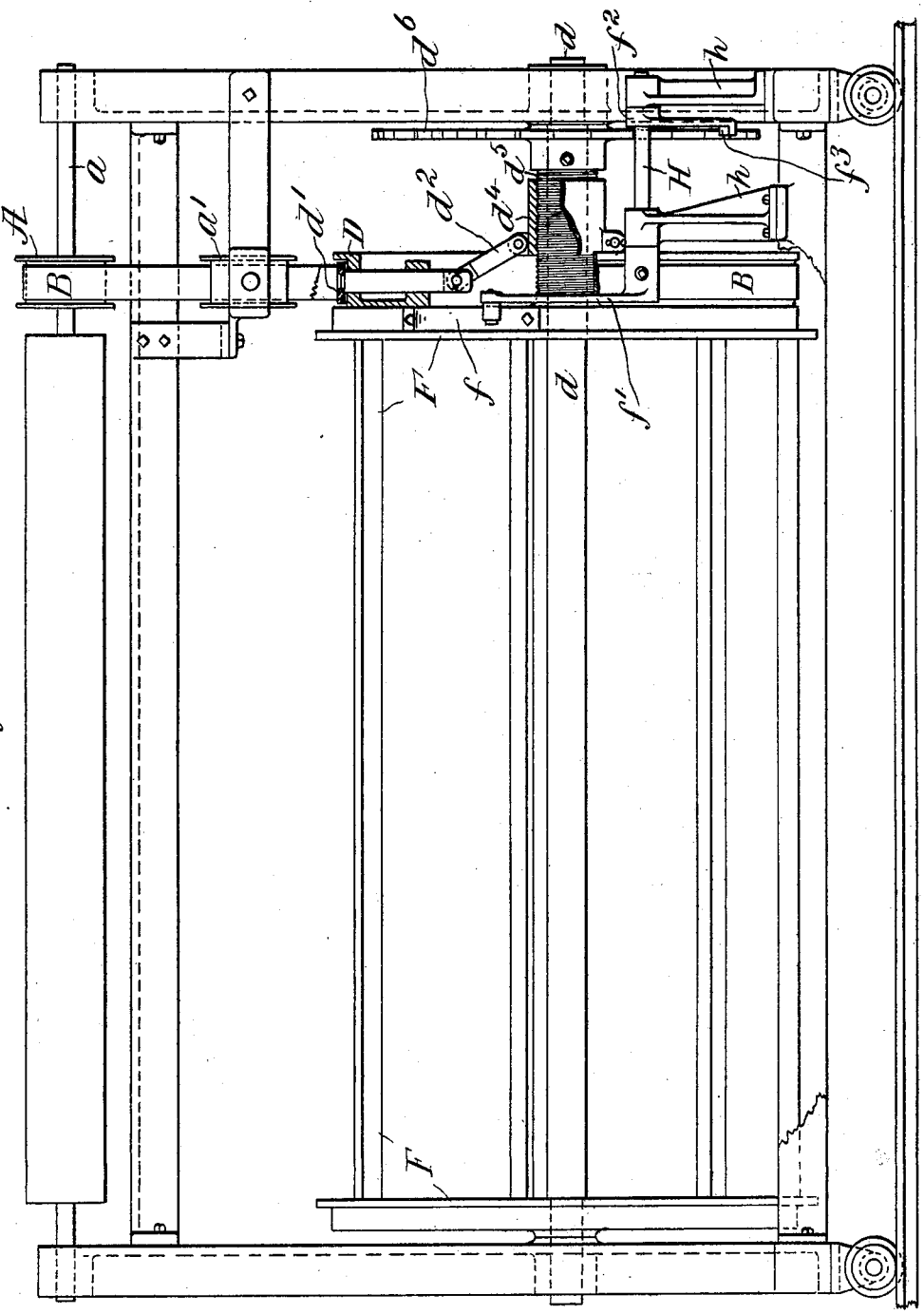
Figure 2:
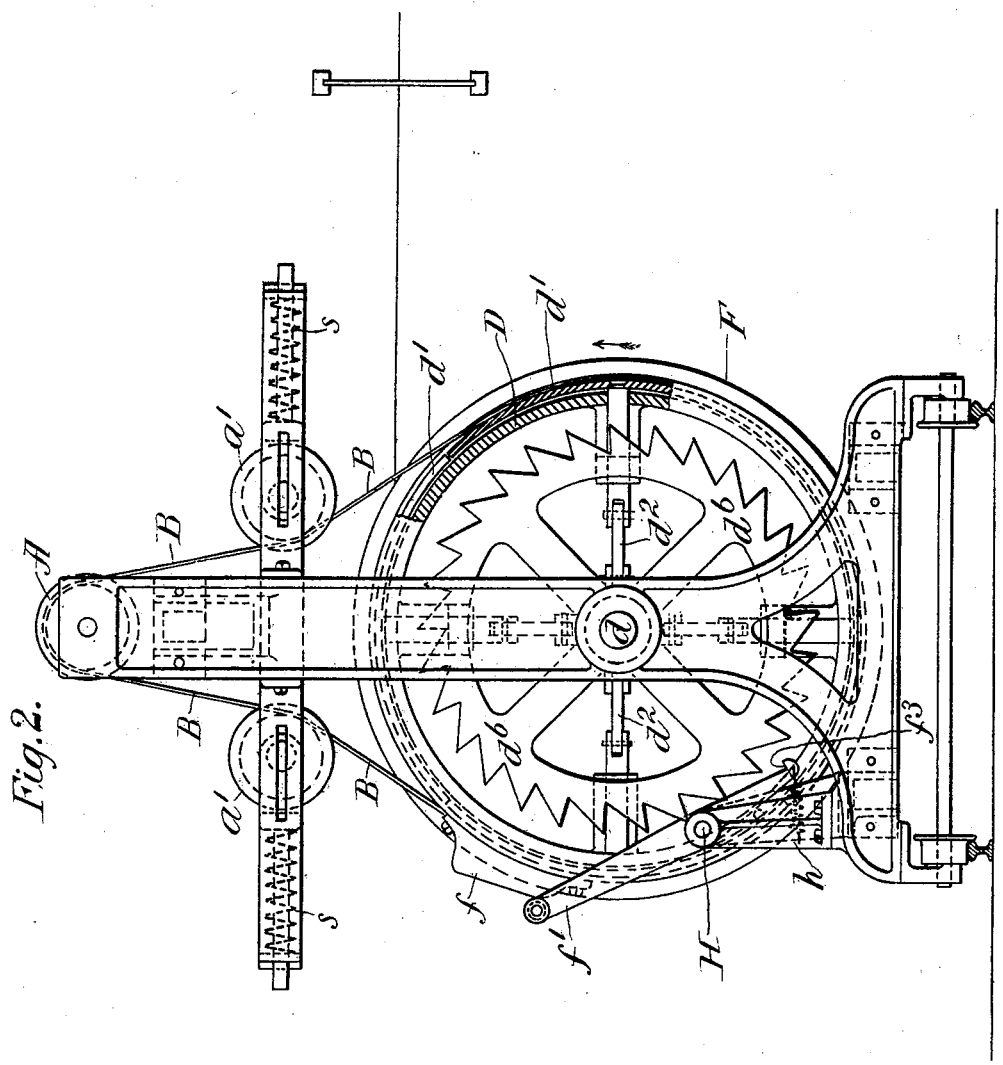

Figure 1 is a side elevation, partly in section, of my mechanism applied to a pulley of a reel. Fig. 2 is an end view of Fig. 1.

My invention is a speed-varying mechanism for pulleys, comprising a driven pulley and a driving-pulley, a belt around the pulleys, and automatic means to increase the periphery of the pulley at any predetermined rate by the revolution of the pulley itself.

In the drawings I have shown my invention as applied to the reel of a wool-dressing machine; but it may obviously be applied to any use when the pulley is used to drive a reel or the like with a varying diameter and whose surface speed must be uniform.

A is the driving-pulley, mounted on a shaft $a$ and provided with a belt B, which passes around it and past idlers $a'$ $a'$ to and around the driven pulley D, fast to shaft $d$, on which is mounted the reel F. The pulley D has a face made up of segments $d'$, each of which is connected by an arm $d^2$ to an internally-screw-threaded sleeve $d^4$. Mounted loosely on shaft $d$ is a second screw-threaded sleeve $d^5$, upon which is screwed the sleeve $d^4$, and the sleeve $d^5$ also carries ratchet $d^6$, so that when the ratchet is turned with relation to shaft $d$ the sleeve $d^5$ is turned and causes the sleeve $d^4$ to travel along the screw-threads, and thereby increase or diminish the circumference of pulley D. Mounted on reel F is a cam $f$, and mounted on a rock-shaft H, carried by brackets $h$, is a lever $f'$, which is fast to shaft H at one end, the other end engaging cam $f$. The rock-shaft carries a second lever $f^2$, provided at one end with a shoulder $f^3$, and lever $f^2$ is so arranged with reference to ratchet $d^6$ that when the shaft H is rocked by cam $f$ through lever $f'$ the shoulder $f^3$ will engage one of the teeth of ratchet $d^6$ and hold ratchet $d^6$ from turning with shaft $d$, thus causing the sleeve $d^4$ to travel along the screw-thread and expand the pulley D. The idlers $a'$ $a'$ are mounted in slotted arms fast to the frame of the reel and are held in engagement with the belt by springs $s$ $s$, so that when the pulley D expands the springs $s$ $s$ will be compressed and the belt correspondingly increased.

The operation is as follows: The surface speed of the pulleys A and D being uniform, the cam $f$ on its revolution causes shoulder $f^3$ to engage ratchet $d^6$ and hold it for a portion of a revolution of reel F, thus causing the sleeve $d^4$ to travel along sleeve $d^5$ and expand the pulley D, as explained above, so that for every revolution of the reel the pulley D is slightly expanded, and if the screw-threads on the sleeves $d^4$ and $d^5$ are given the proper pitch the pulley D will expand as the diameter of the reel is increased by the winding on of threads and the reel will always be given a uniform surface speed.

I am aware that pulleys have been made so that by the operator moving a hand-wheel or a lever the periphery of the pulley may be increased and that governors have been used to automatically maintain the number of revolutions of a shaft constant by automatically increasing the periphery of a driving-pulley; but I am the first, so far as I know, to automatically increase the periphery of a pulley according to any predetermined fixed rate by the revolution of the pulley itself and irrespective of the speed of the driving-shaft, whether uniform or not. This is the main feature of my invention and is of great value, especially in cases where the surface speed of the pulley must increase or decrease with the increasing or decreasing surface speed of the reel of yarn which is being wound or unwound.

While I have shown in the drawings the expanding mechanism applied to the driven pulley, it is obvious that it may be applied to the driving-pulley, and it is also obvious that the automatic mechanism for expanding the pulley at any predetermined rate may be materially altered, and I do not, therefore, wish to limit myself to the precise form shown in the drawings.

What I claim as my invention is—

1. A speed-varying mechanism for pulleys comprising a driven pulley, a driving-pulley, a belt around the pulleys, and automatic means actuated by the revolution of the pulley to increase the periphery of the pulley at any predetermined fixed rate substantially as shown and described.

2. The speed-varying mechanism for pulleys above described made up of a driven pulley with a segmental face; a driving-pulley; a belt around the pulleys and positively-actuated means to expand the driven pulley made up of an internally-screw-threaded sleeve $d^4$; arms $d^2$ carried by that sleeve and connected to the segments of the driven pulley; an externally-screw-threaded sleeve $d^5$ loosely mounted on the shaft of the driven pulley and carrying sleeve $d^4$; a ratchet fast to the sleeve $d^5$ and positively-actuated means to prevent the rotation of the ratchet and thus cause the sleeve $d^4$ to travel along the sleeve $d^5$ all substantially as shown and described.

GEORGE SMETHURST.

Witnesses:
MICHAEL MAY,
PAUL WILSON.